United States Patent [19]

Meisner et al.

[11] Patent Number: 5,279,107
[45] Date of Patent: Jan. 18, 1994

[54] FUEL CONTROL SYSTEM WITH FUEL METERING VALVE FAULT ACCOMMODATION

[75] Inventors: Richard Meisner, Glastonbury; Matthew J. Schryver, Rocky Hill, both of Conn.

[73] Assignee: United Technologies Corporation, Hartford, Conn.

[21] Appl. No.: 906,604

[22] Filed: Jun. 30, 1992

[51] Int. Cl.⁵ .............................................. F02C 9/28
[52] U.S. Cl. .................................. 60/39.03; 60/39.281
[58] Field of Search ........................... 60/39.03, 39.281

[56] References Cited

U.S. PATENT DOCUMENTS

| | | | |
|---|---|---|---|
| 4,032,757 | 6/1977 | Eccles | 60/39.281 |
| 4,397,148 | 8/1983 | Stockton et al. | 60/243 |
| 4,794,755 | 1/1989 | Hutto et al. | 60/39.281 |
| 4,821,193 | 4/1989 | Barber et al. | 60/39.281 |

Primary Examiner—Louis J. Casaregola
Attorney, Agent, or Firm—Randy G. Henley

[57] ABSTRACT

An apparatus is disclosed for a fuel control system of a turbine engine powerplant. Various construction details have been developed which provide means to generate a backup command current for controlling the fuel flow rate to the turbine engine powerplant. In one embodiment, a means to generate a backup command current includes means to convert a fuel flow derivative to a backup command current using known hardware characteristics and an estimated null bias signal. The backup command current is input to a switch along with a command current generated by comparing a reference signal to a feedback signal from a metering valve. The switch responds to means for failure recognition which detects failures in the sensing of the feedback signal. The switch responds to a failure of the feedback signal by inputting the backup command current to a torque motor for controlling a metering valve position.

14 Claims, 1 Drawing Sheet

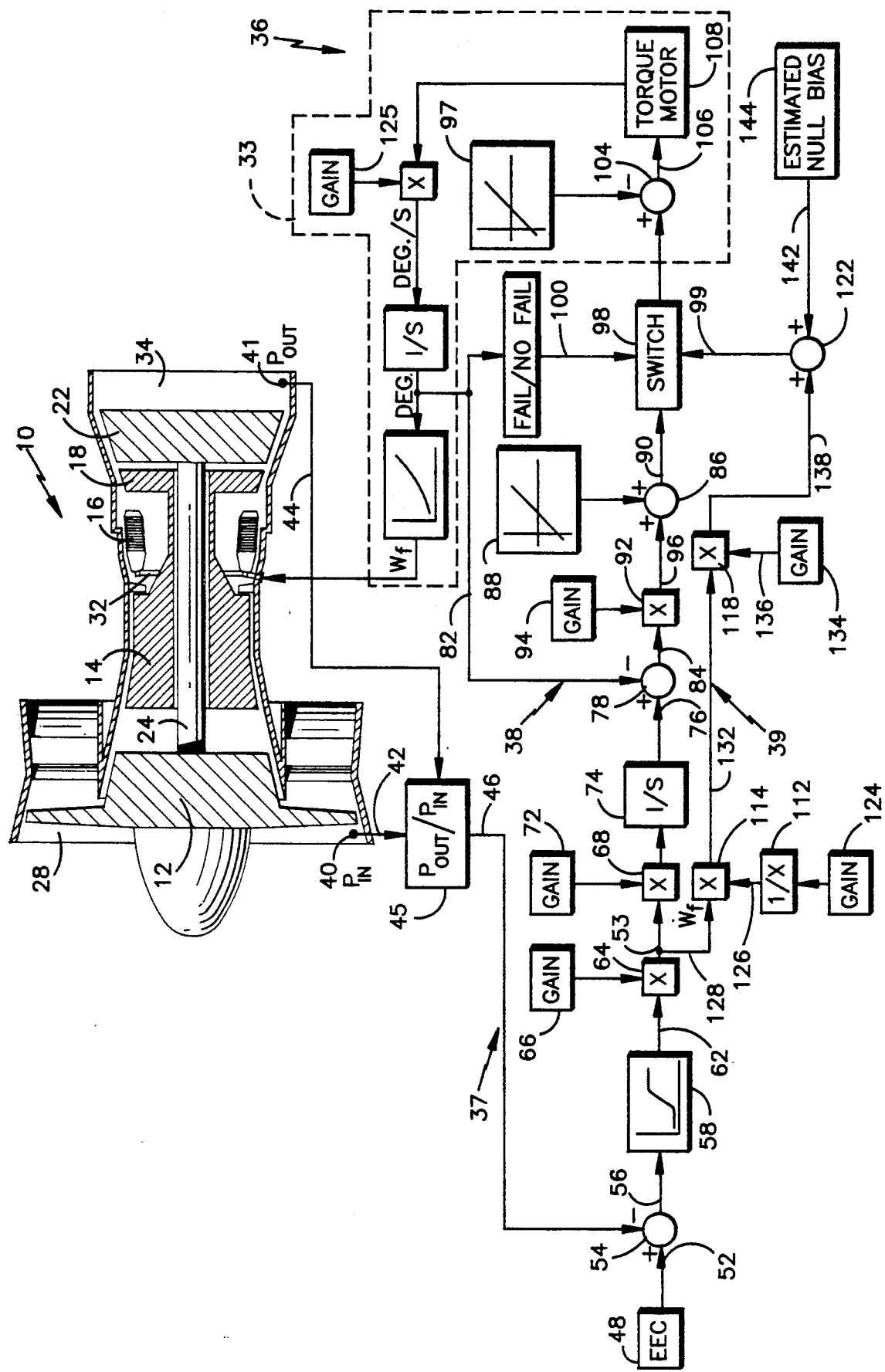

FUEL CONTROL SYSTEM WITH FUEL METERING VALVE FAULT ACCOMMODATION

TECHNICAL FIELD

This invention relates to a gas turbine engine, and more particularly to a fuel control system for a gas turbine engine.

BACKGROUND OF THE INVENTION

In a typical fuel control system of a gas turbine powerplant for an aircraft, a fuel control system modulates the fuel flow to the powerplant in response to the operator's demands. The operator's thrust demands are input to an electronic engine control (EEC) which monitors various engine parameters to determine the amount of fuel flow required to meet the operator'thrust demand. The main objective of the fuel control system is to be responsive to the operator's thrust demand while at the same time prevent engine stall, engine surge, or inefficient operation of the powerplant.

The EEC receives the operator's thrust demand and calculates a desired engine parameter which correlates to the thrust of the powerplant. Engine pressure ratio, referred to as EPR, is one such engine parameter although others, such as shaft rotational speed, may be used. EPR is the ratio of engine output pressure to engine inlet pressure. An EPR reference signal, which corresponds to the EPR required to meet the operator's thrust demand, is produced by the EEC. EPR reference is compared to a sensed or actual EPR taken from pressure sensors mounted at the inlet and outlet of the powerplant. The comparison generates an EPR error signal. EPR error is manipulated by the control system to generate a metering valve position reference referred to as a requested degrees resolver signal (DR). DR is compared to a sensed or actual DR to generate a degrees resolver error (DRE) signal. DRE corresponds to the amount of displacement of the metering valve required to meet the operator'demand. A torque motor mechanically positions the metering valve in response to a command current signal. The command current signal is generated by the fuel control system and correlates to the DRE.

In essence, the fuel control system is comprised of two feedback loops. The major loop includes a comparison of the sensed EPR to the EPR reference to produce the EPR error. The minor loop includes the comparison of the sensed metering valve position to the DR to produce the DRE. A failure in the minor loop results in the fuel flow being switched to a fail-safe fuel flow. For safety reasons, the fail-safe position for aircraft powerplants is a minimum flow position. The minimum flow position of the metering valve may result in an in-flight shut-down (IFSD) of the engine. It is desirable to minimize the IFSD rate by minimizing the likelihood of a failure in the fuel control system.

The above art notwithstanding, scientists and engineers under the direction of Applicants' Assignee are working to develop fuel control systems which result in a minimal in-flight shut-down rate for gas turbine powerplants used on aircraft.

DISCLOSURE OF THE INVENTION

According to the present invention, a turbomachine includes a fuel control system having switching means responsive to a failure in the sensed metering valve position signal and adapted to switch between a command current signal, which uses a feedback signal from a metering valve position sensor, and a backup command current signal, which is developed from a reference fuel flow derivative and from known hardware characteristics.

According to a specific embodiment of the present invention, the backup command current signal is developed by inputting the reference fuel flow derivative and an inverse hardware gain to a first multiplier, inputting the output signal of the first multiplier and a metering valve gain to a second multiplier, and inputting the output signal of the second multiplier and an estimated null bias to a summer. The back up command current and the sensed command current are input to a switching means which is responsive to means for failure recognition. The failure recognition means includes logic to detect the presence or absence of a failure in the metering valve position signal. If no failure is present, the sensed command current is input to a torque motor which mechanically controls the position of the fuel metering valve. In the event of a failure in the sensed metering valve position, the backup command current is input to the torque motor.

According further to the present invention, a method of controlling a turbomachine includes the steps of generating a command current, generating a backup command current, inputting the command current and backup command current into switching means wherein the switching means is responsive to a signal indicative of a failure in the metering valve position feedback signal, and wherein generating a backup command current includes the steps of inverting a fuel metering unit gain, multiplying the inverted fuel metering unit gain by a calculated fuel flow derivative to generate an output signal, multiplying the output signal by a metering valve gain to generate a second output signal, and summing the second output signal and an estimated null bias of the fuel metering unit.

A primary feature of the present invention is the generation of a backup command current. Another feature is the generation of a backup command current without a feedback from the fuel metering valve position sensor.

A primary advantage of the present invention is the minimal level of the in-flight shut-down rate as a result of having a backup of command current signal in the fuel control system. The backup command current provides means to continue operation of the gas turbine powerplant in the event of a loss of the sensed metering valve position. Another advantage is the operability of the fuel control system in the event of a failure in the fuel metering valve position signal as a result of the backup command current. The backup command current is generated using known hardware characteristics and sensed turbine engine parameters.

The foregoing and other objects, features and advantages of the present invention will become more apparent in light of the following detailed description of the exemplary embodiments thereof, illustrated in the accompanying drawings.

BRIEF DESCRIPTION OF THE DRAWINGS

The sole FIGURE is a block diagram schematically illustrating a fuel control system having a backup command current loop.

BEST MODE FOR CARRYING OUT THE INVENTION

Illustrated in the FIGURE is an axial flow gas turbine powerplant 10 including a low pressure compressor 12, a high pressure compressor 14, a combustor 16, a high pressure turbine 18, and a low pressure turbine 22. The low pressure compressor and the low pressure turbine are connected by a low pressure shaft 24. The high pressure compressor and the high pressure turbine are connected by a high pressure shaft 26. Working fluid enters the gas turbine engine through an inlet 28 and passes through the low pressure compressor and high pressure compressor. The compressors add energy in the form of increased momentum to the working fluid. The working fluid enters the combustor where it is mixed with fuel and the mixture is combusted. The fuel enters the combustor through a plurality of fuel nozzles 32 disposed about the combustor and connected to a fuel metering unit 33, which is illustrated schematically for clarity purposes. The products of the combustion are expanded through the high pressure turbine and the low pressure turbine. A portion of the energy extracted from the working fluid in the turbines is transferred to the compressor via the rotors. The fluid exiting the low pressure turbine is exhausted through an engine outlet 34.

The thrust of the gas turbine engine is controlled by a fuel control system 36 illustrated schematically in the FIGURE. To provide a general overview of the fuel control system, it may be broken down into a major loop 37, a minor loop 38, and a backup command current loop 39. The major loop encompasses the fuel control system and receives inputs from the powerplant, the EEC, the minor loop, and the backup command current loop. The major loop compares a thrust requirement signal developed from the operator's thrust demand, and a sensed thrust signal, which is measured directly by various powerplant sensors. The comparison produces a thrust measure error signal which correlates to the difference between the two measures. The thrust measure error signal indicates the amount of correction in the thrust measure which is necessary to meet the operator's demand.

The minor loop and backup command current loop take reference signals from the major loop, manipulate those reference signals to generate command currents, and input the command currents into the fuel metering unit. The minor loop compares a desired flow position for the metering valve, developed from the thrust response error signal, and a sensed flow position which is measured directly from the metering valve. This comparison produces a metering valve position error signal which correlates to the difference between these two measures. The metering valve position error signal indicates the amount of correction of the metering valve flow position necessary to meet the fuel flow demand. The minor loop, which is a high gain system, adapts the fuel control system to accommodate errors in the biases and tolerances of the specific hardware of the fuel metering unit. A fuel control system with only a major loop and no minor loop is a low gain system and is more sensitive to differences in hardware characteristics and environmentally driven fluctuations in system response.

The backup command current loop operates a fuel metering valve fault accommodation system. The backup command current loop produces a signal which is substituted for the metering valve position error signal in the event of a failure in the minor loop. This loop responds to a fuel flow derivative, developed within the major loop, and develops a backup command current. The development is accomplished by multiplying the fuel flow derivative by several gains and accounting for a null bias present in the fuel metering unit.

More specifically, the major loop receives an input from an electronic engine control (EEC) 48. The EEC is an electronic data processor which monitors various powerplant parameters and converts operator demands into electronic control signals. The EEC receives inputs from the operator which correspond to thrust level demands. The operator's demand for thrust is converted by the EEC into an engine parameter which correlates to the thrust of the engine. As shown in the FIGURE, the parameter generated by the EEC is an engine pressure ratio reference (EPR REFERENCE) signal 52. Although an EPR REFERENCE signal is shown, other reference parameters may be used for comparison purposes, such as a shaft speed reference signal.

The major loop also receives inputs from a pressure sensor 40 disposed in the inlet and a pressure sensor 41 disposed in the outlet. The inlet pressure sensor generates an inlet pressure signal 42 and the outlet pressure sensor generates an outlet pressure signal 44. The major loop includes a divider 45 which receives the inlet pressure signal and the outlet pressure signal and generates a sensed engine pressure ratio (EPR) signal 46. EPR is defined as the ratio of engine outlet pressure divided by the engine inlet pressure. EPR directly correlates to the thrust of the powerplant.

The EPR and EPR reference are input to a summer 54 where they are compared. The difference results in an engine pressure ratio error (EPRE) signal 56. The EPRE signal corresponds to the change in engine pressure ratio required to meet the change in thrust demanded by the operator. The EPRE signal is input to a compensator 58 which compensates the EPRE signal for various transient operations and generates an EPR compensated signal 62. As is well known, compensation is used to provide a responsive but smooth transition from one steady state operating condition to another. The EPR compensated signal is input to a multiplier 64 which multiplies the EPR compensated signal by a first gain 66. The first gain is an engine gain and corresponds to the gain of the fuel flow derivative as a function of EPR for the engine. Multiplication of the EPR compensated signal by the first gain generates a reference fuel flow derivative signal ($\dot{W}_f$). $\dot{W}_f$ is then branched off into the backup command current loop and input to a second multiplier 68.

The second multiplier multiplies $\dot{W}_f$ by a second gain 72. The second gain is a metering valve gain and corresponds to the gain of the metering valve position derivative as a function of the fuel flow derivative of a specific metering valve position. The product of the second multiplier is a reference metering valve position derivative, referred to as the degrees resolver derivative ($\dot{DR}$). An integrator 74 converts the $\dot{DR}$ to a degrees resolver reference signal (DR) 76, which is input to a second summer 78. The second summer is included within the minor loop. The second summer compares the DR to a sensed metering valve position 82, hereinafter referred to as the degrees resolver sensed (DR sensed). The difference between the DR and DR sensed results in a degrees resolver error (DRE) signal 84. DRE corresponds to the change in metering valve position required to meet the change in thrust demanded by the operator. DRE is input to a third multiplier 92 which multiplies the DRE by a third gain 94. The third gain is a fuel metering unit gain and corresponds to the gain of the command current as a function of metering valve position. The product of the third multiplier is an unbiased command current 96. The unbiased command current is input to a third summer 86 where a null bias 88 is added to the unbiased command current signal to produce a properly biased command current signal 90. The null bias is necessary to account for the initial biasing of the mechanical position of the fuel metering unit. The fuel metering unit is initially biased, as represented by item 97 in the FIGURE, to ensure that the failsafe flow position of the fuel metering unit corresponds to a minimum flow position.

In prior art fuel control systems, the command current 90 would be fed directly into the fuel metering unit. Within the fuel metering unit a torque motor, responsive to an input current, controls the positioning of the metering valve. In accordance with the present invention, however, the command current is input into a switch 98. The switch also receives a backup command current signal 99 and an input 100 from means for failure recognition. The failure recognition means includes logic for detecting the presence or absence of a failure in the metering valve position signal. The failure recognition means produces either a "no-fail" or "fail" output, depending on the operable state of the minor loop. The switch responds to a "no-fail" output from the failure recognition means by inputting the command current into the fuel metering unit. As shown in the FIGURE, the fuel metering unit is initially biased, as shown by summer 104, and includes a torque motor 108 which mechanically positions the metering valve. The switch responds to a "fail" output from the failure recognition means by inputting the backup command current signal into the fourth summer and thereby into the torque motor. In this way, in the event of a failure in the minor loop, an in-flight shutdown is avoided by the availability of the backup command current. Although the failure recognition means is described as logic for detecting a failure, other means may also be used such as a sensor responsive to the presence or absence of a feedback signal.

The backup command current loop operates by converting the fuel flow derivative to the backup command current using known hardware characteristics and an estimated null bias. The backup command current loop includes a first invertor 112, a first multiplier 114, a second multiplier 118, and a summer 122. A fuel metering unit gain 124 is input to the first invertor. The fuel metering unit gain is the gain 125 of the metering valve (measured as degrees resolver derivative) as a function of command current input to the fuel metering unit. The first invertor takes the inverse of the hardware gain and inputs the inverse hardware gain signal 126 to the first multiplier. The first multiplier also receives the $\dot{W}_f$ signal which is branched 128 off the major loop. The two signals are multiplied together and the output 132 is input to the second multiplier. A metering valve gain 134 is also input to the second multiplier. The metering valve gain corresponds to the second gain 72 and is the gain of the metering valve derivative (measured as degrees resolver derivative) as a function of the fuel flow derivative for a specific metering valve position. The output 138 of the second multiplier is then input to the summer. The summer also receives an input 142 of an estimated null bias 144. The estimated null bias is the steady state component of the command current. The steady state component may be determined by various procedures. A suggested method is to filter the command current to remove transients. Another method is to time average the command current signal. The summed output is the backup command current which is input to the switch. During operation, the major loop receives inputs from the EEC and the engine and generates a DR signal which is input to the minor loop and a $\dot{W}_f$ signal which is input to the backup command current loop. Both the minor loop and backup command current loop generate command currents which are input to the switch. Under normal operating conditions, the switch inputs into the fuel metering unit the command current generated by the minor loop. In the event of a loss of the feedback signal from the metering valve, the switch will input the backup command current to the fuel metering unit. Switching to the backup command current may avoid an in-flight shut-down of the engine due to a loss of the feedback signal from the metering valve.

Although the invention has been shown and described with respect to detailed embodiments thereof, it should be understood by those skilled in the art that various changes, omissions, and additions may be made therein and thereto, without departing from the spirit and scope of the invention.

We claim:

1. A turbomachine including a compressor section, a combustor, a turbine section, a rotor joining the compressor section and the turbine section, a source of fuel, an electronic engine control which outputs an engine reference signal, a fuel metering unit including a torque motor and a metering valve adapted to meter fuel flow in response to inputs from the torque motor, and a fuel control system, wherein the fuel control system includes:

means to sense the metering valve position to generate a sensed metering valve position (DR sensed) signal;

means to produce a sensed engine signal which corresponds to the engine reference signal;

a first summer responsive to the reference and sensed signals to generate an error signal;

a compensator responsive to the error signal to generate a compensated error signal;

means to apply a first gain to convert the compensated error signal to a fuel flow derivative ($\dot{W}_f$) signal;

means to apply a second gain to convert the $\dot{W}_f$ signal to a metering valve position derivative (DR) signal;

an integrator responsive to the DR signal to generate a reference metering valve position (DR) signal;

a second summer responsive to the DR signal and the DR sensed signal to generate a metering valve error (DRE) signal;

means to apply a third gain to the corrected DRE signal to generate an unbiased command current signal;

a third summer responsive to the unbiased command current signal and a null bias signal to generate a command current signal;

a torque motor adapted to position the metering valve in response to the command current; and a fuel metering valve fault accommodation system adapted to provide a backup command current in the event of a failed sensed metering valve position signal, the fuel metering valve fault accommodation system including:

means for failure recognition, the failure recognition means being responsive to the DR sensed signal and adapted to recognize a failure of the DR sensed signal;

a first invertor responsive to a fuel metering unit gain to generate an inverse fuel metering unit gain signal;

a first multiplier responsive to the $\dot{W}_f$ signal and the inverse fuel metering unit gain signal;

a second multiplier responsive to the output of the first multiplier and a metering valve gain;

a fourth summer responsive to the output of the second multiplier and an estimated null bias signal to generate a backup command current; and a switch responsive to the command current, the backup command current, and the failure recognition means, wherein the switch is adapted to send the backup command current to the torque motor in response to a failure of the DR sensed signal and to send the command current to the torque motor otherwise.

2. The turbomachine according to claim 1, further including means to sense inlet pressure to generate an inlet pressure signal, means to sense outlet pressure to generate an outlet pressure signal, wherein the engine reference signal is an engine pressure ratio reference (EPR Reference) signal, and wherein the means to produce a sensed engine signal is means to divide the inlet pressure signal by the outlet pressure signal to produce a sensed engine pressure ratio (EPR) signal.

3. The turbomachine according to claim 1, wherein the first gain corresponds to the gain of derivative of fuel flow rate as a function of EPR for the turbomachine, the second gain corresponds to the gain of derivative of metering valve position as a function of the derivative of fuel flow rate for the metering valve, and the third gain corresponds to the gain of the command current as a function of metering valve position.

4. The turbomachine according to claim 1, wherein the estimated null bias signal is a filtered command current, the filtering adapted to remove transients.

5. The turbomachine according to claim 1, wherein the estimated null bias signal is a time average of the command current.

6. A fuel control system for a turbomachine, the fuel control system including a fuel metering unit having a metering valve and a torque motor adapted to control positioning of the metering valve in response to an input current, means to generate a derivative of the fuel flow rate ($\dot{W}_f$), means to generate a sensed command current responsive to the $\dot{W}_f$ signal and a sensed metering valve position signal (DR sensed), and a fuel metering valve fault accommodation system, wherein the fuel metering valve fault accommodation system includes:

means for failure recognition, the failure recognition means being responsive to the DR sensed signal and adapted to recognize a failure of the DR sensed signal;

an first invertor responsive to a fuel metering unit gain to generate an inverse fuel metering unit gain signal;

a first multiplier responsive to the $\dot{W}_f$ signal and the inverse fuel metering unit gain signal;

a second multiplier responsive to the output of the first multiplier and a metering valve gain;

a summer responsive to the output of the second multiplier and an estimated null bias signal to generate a backup command current; and a switch responsive to the command current, the backup command current, and the failure recognition means, wherein the switch is adapted to send the backup command current to the torque motor in response to a failure of the DR sensed signal and to send the command current to the torque motor otherwise.

7. The fuel control system according to claim 6, wherein the fuel metering unit gain corresponds to the gain of the command current as a function of the metering valve position and the metering valve gain corresponds to the gain of the derivative of the metering valve position as a function of the derivative of the fuel flow rate.

8. The fuel control system according to claim 6, wherein the estimated null bias signal is a filtered command current, the filtering adapted to remove transients.

9. The fuel control system according to claim 6, wherein the estimated null bias signal is a time average of the command current.

10. A method of controlling a turbomachine, the turbomachine having a compressor section, a combustor, a turbine section, a rotor joining the compressor section and the turbine section, a source of fuel, an electronic engine control which outputs an engine reference signal, and a fuel control system, the fuel control system including a metering valve adapted to meter fuel flow and a torque motor adapted to control positioning of the metering valve in response to an input current, the method including the steps of:

computing an error signal between a reference metering valve position signal, computed from the engine reference signal, and a sensed metering valve position signal;

generating a command current that is a function of the error signal;

computing a reference fuel flow derivative from the engine reference signal and corresponding engine parameters;

multiplying the reference fuel flow derivative by an inverse fuel metering unit gain to produce a first output;

multiplying the first output by a metering valve gain to produce a second output;

summing the second output and an estimated null bias to produce a backup command current; and switching between the command current and backup command current, wherein the backup command current is input into the torque motor if a failure occurs in the sensed metering valve position signal.

11. The method according to claim 10, further including the step of generating the fuel metering unit gain, wherein this step includes computing the gain of the command current as a function of the metering valve position.

12. The method according to claim 10, further including the step of generating the metering valve gain, wherein this step includes computing the gain of the derivative of the metering valve position as a function of the derivative of the fuel flow rate.

13. The method according to claim 10, further including the step of generating the estimated null bias by filtering the command current to remove transients.

14. The method according to claim 10, further including the step of generating the estimated null bias by taking a time average of the command current.

* * * * *